United States Patent
Nagashima et al.

(10) Patent No.: US 8,301,348 B2
(45) Date of Patent: Oct. 30, 2012

(54) VEHICULAR CONTROL APPARATUS AND METHOD FOR SHIFT-BY-WIRE DEVICE

(75) Inventors: Fumitaka Nagashima, Fuji (JP); Yoshiaki Ueda, Fuji (JP); Ryusuke Oshiro, Shizuoka (JP); Tomoyuki Suwabe, Fujinomiya (JP)

(73) Assignee: JATCO Ltd, Fuji-shi (JP)

( * ) Notice: Subject to any disclaimer, the term of this patent is extended or adjusted under 35 U.S.C. 154(b) by 357 days.

(21) Appl. No.: 12/700,425

(22) Filed: Feb. 4, 2010

(65) Prior Publication Data
US 2010/0206118 A1 Aug. 19, 2010

(30) Foreign Application Priority Data
Feb. 17, 2009 (JP) .................. 2009-034658

(51) Int. Cl.
*G06F 17/00* (2006.01)
(52) U.S. Cl. ............. 701/58; 701/59; 701/67; 74/473.1; 74/335
(58) Field of Classification Search ............... 701/58–67; 74/473.1, 335
See application file for complete search history.

(56) References Cited

U.S. PATENT DOCUMENTS

| | | | | |
|---|---|---|---|---|
| 6,378,393 B1 * | 4/2002 | Bates | ......................... | 74/473.18 |
| 6,508,139 B2 * | 1/2003 | Onodera | ......................... | 74/335 |
| 6,695,117 B2 | 2/2004 | Haertel et al. | | |
| 6,918,314 B2 * | 7/2005 | Wang | ............................ | 74/335 |
| 7,600,446 B2 * | 10/2009 | Mizuno et al. | ............... | 74/473.1 |
| 7,845,248 B2 * | 12/2010 | Yoshiyama et al. | ............ | 74/335 |
| 7,966,903 B2 | 6/2011 | Kimura et al. | | |
| 2004/0226801 A1 | 11/2004 | De Jonge et al. | | |
| 2005/0126322 A1 | 6/2005 | Kozaki et al. | | |
| 2008/0302628 A1 | 12/2008 | Kimura et al. | | |
| 2009/0000411 A1 | 1/2009 | Nakayama et al. | | |

FOREIGN PATENT DOCUMENTS

| | | |
|---|---|---|
| EP | 2 006 581 A2 | 12/2008 |
| JP | 06193729 A * | 7/1994 |
| JP | 2003-054366 A | 2/2003 |
| JP | 2003-080967 A | 3/2003 |
| JP | 2007-170546 A | 7/2007 |
| JP | 2008-051174 A | 3/2008 |
| JP | 2008-304010 A | 12/2008 |

* cited by examiner

*Primary Examiner* — Ramsey Refai
(74) *Attorney, Agent, or Firm* — Foley & Lardner LLP

(57) ABSTRACT

In vehicular control method and apparatus for a shift-by-wire device, a selected shift position is modified to at least one of a vehicular parking position, a neutral position, and a traveling position, the selected shift position is modified to the vehicular parking position when a power switch is switched to an OFF position, and the modification of the shift position to the vehicular parking position is inhibited when an operation pattern of an operation input section while the power switch is in the ON position is made coincident with the operation pattern prescribed as a cipher code which inhibits the shift position modification to the vehicular parking position, the operation patterns being constituted by a combination of operation patterns which would not be carried out in the operation section during an ordinary traveling.

11 Claims, 3 Drawing Sheets

VEHICULAR CONTROL APPARATUS AND METHOD FOR SHIFT-BY-WIRE DEVICE

BACKGROUND OF THE INVENTION (1) Field of the Invention

The present invention relates to vehicular control apparatus and method for a shift-by-wire device.

(2) Description of Related Art

Some types of vehicles have shift position sensors for detecting shift positions (selection ranges) selected by operations of vehicle operators (vehicle drivers) and have driven actuators based on the detected selection ranges to operate manual valves and parking mechanisms of automatic transmissions. In such vehicles as described above, there are mechanical devices (links) used for interlocking operations of manual valves of the automatic transmissions and the parking mechanisms with shift lever operations. These mechanical devices are replaced with electrical mechanisms and have referred to as, so-called, shift-by-wire vehicles.

Some shift-by-wire vehicles have functions to automatically change the shift position s of the automatic transmissions to vehicular parking ranges (so-called, P ranges) (auto-parking functions) when ignition switches or power switches are switched to OFF positions.

In addition, some other types of the shift-by-wire vehicles have functions (auto-parking functions) to be switched automatically to P ranges with the ignition switches or the power switches in the OFF positions and with no selections of the P ranges from among the shift-by-wire vehicles in which switches additionally attached separately from the shift levers (Parking switches) are used to switch the selection or non-selection of P ranges.

In the shift-by-wire vehicles having the auto-parking functions, when the ranges are switched into P ranges, revolutions of output shafts of the automatic transmissions are blocked through the parking mechanisms and the automatic transmissions are in the parking states by which vehicle road wheels are not revolved so that the vehicles are not moved.

In an assembly line of the vehicles, such a line that only one side road wheels from among left and right road wheels are mounted on a belt conveyer and the other side road wheels run spontaneously is widely known (a line in which a single sliding conveyer has been adopted). In the assembly line in which the single sliding conveyer has been adopted, in a case where the shift-by-wire vehicles in which the auto-parking function is provided are conveyed, the revolutions of the road wheels are blocked due to the operations of the parking mechanisms so that the road wheels not mounted on the belt conveyer are drag out.

Therefore, while the assembly line conveys the shift-by-wire vehicles, the ignition switches or the power switches cannot be switched to the OFF positions so that electric power consumptions are carried out for the vehicle batteries. In addition, it is necessary to switch the ignition switches or the power switches in the ON position or the OFF position for all of the vehicles so that a total operation cost to assembly the vehicles is increased.

Two Japanese Patent Application Publications of JP2003-080967 published on Mar. 19, 2003 and JP2007-170546 published on Jul. 5, 2007 exemplify the shift-by-wire vehicles in which the auto-parking functions are provided and P ranges (operations of the parking mechanisms) can be released under constant conditions.

The former Japanese Patent Application Publication No. JP2003-080967 published on Mar. 19, 2003 discloses a vehicular control apparatus in which a changeover switch to release P range is provided. In this apparatus, the switch is operated with no insertion of an ignition key into a key cylinder so that the shift range can be changed from P range to the neutral range ("N") range.

The latter Japanese Patent Application Publication No. JP2007-170546 published on Jul. 5, 2007 discloses the shift-by-wire vehicle in which the change of the shift range is carried out according to the operations of changeover switches. In this vehicle, when the ignition switch is switched to the OFF position after the input of the N range switch, the shift ranges of the automatic transmission are set to N (neutral) range not to P range.

SUMMARY OF THE INVENTION

However, in the former Japanese Patent Application First Publication described first, it is necessary to install a special switch additionally. Then, the number of parts are increased. Since the changeover switch is installed within a vehicular passenger compartment, it is conceivable for the vehicle driver to be touched on the changeover switch without intention, in this case, the P range is released even in a case of no intention for the P range to be released, and the vehicle is finally to be enabled to be moved.

In addition, in the latter above-described Publication described second, the vehicle driver mistakenly depresses the N range switch but does not depress the P range switch and the ignition switch is, thereafter, turned off. At this time, the vehicle is enabled to be moved even if the vehicle driver has no intention to release the P range.

It is, therefore, an object of the present invention to provide vehicular control apparatus and method for a shift-by-wire device in which the release of the parking range is made possible while preventing the release of the parking range accidentally.

According to one aspect of the present invention, there is provided a vehicular control apparatus for a shift-by-wire device, comprising: an operation section configured to be manually operable to select one of shift positions constituted by a vehicular parking position, a neutral position, and a traveling position; and a control section configured to control an actuator to modify at least one of the parking position, the neutral position, and the traveling position, the control section modifying the shift position to the vehicular parking position at which a movement of the vehicle is blocked through the actuator when a power switch configured to switch a vehicular power supply to at least one of an ON position and an OFF position is changed to the OFF position, the control section inhibiting the modification of the shift position to the vehicular parking position and modifying the shift position to the neutral position at which the vehicle is enabled to move when an operation pattern of the operation section while the power switch is in the ON position is coincident with the operation pattern prescribed as a cipher code which inhibits the modification of the shift position to the vehicular parking position, and the operation pattern prescribed as the cipher code being constituted by a combination of the operation patterns which would not be carried out in the operations of the operation section during an ordinary traveling.

According to another aspect of the present invention, there is provided a vehicular control method for a shift-by-wire device, comprising: providing an operation section configured to be manually operable to select one of shift positions constituted by a vehicular parking position, a neutral position, and a traveling position; controlling an actuator to modify at least one of the vehicular parking position, the neutral position, and the traveling position; modifying the shift position to the vehicular parking position at which a movement of the vehicle is blocked through the actuator when a power switch configured to switch a vehicular power supply to at least one of an ON position and an OFF position is changed to the OFF position; and inhibiting the modification of the shift position to the vehicular parking position and modifying the shift position to the neutral position at which the vehicle is enabled to move when an operation pattern of the operation section while the power switch is in the ON position is coincident with the operation pattern prescribed as a cipher code which inhibits the modification of the shift position to the vehicular parking position, the operation pattern prescribed as the cipher code being constituted by a combination of the operation patterns which would not be carried out in the operations of the operation section during an ordinary traveling

DETAILED DESCRIPTION OF THE INVENTION

Reference will, hereinafter, be made to the drawings in order to facilitate a better understanding of the present invention.

Figure 1:
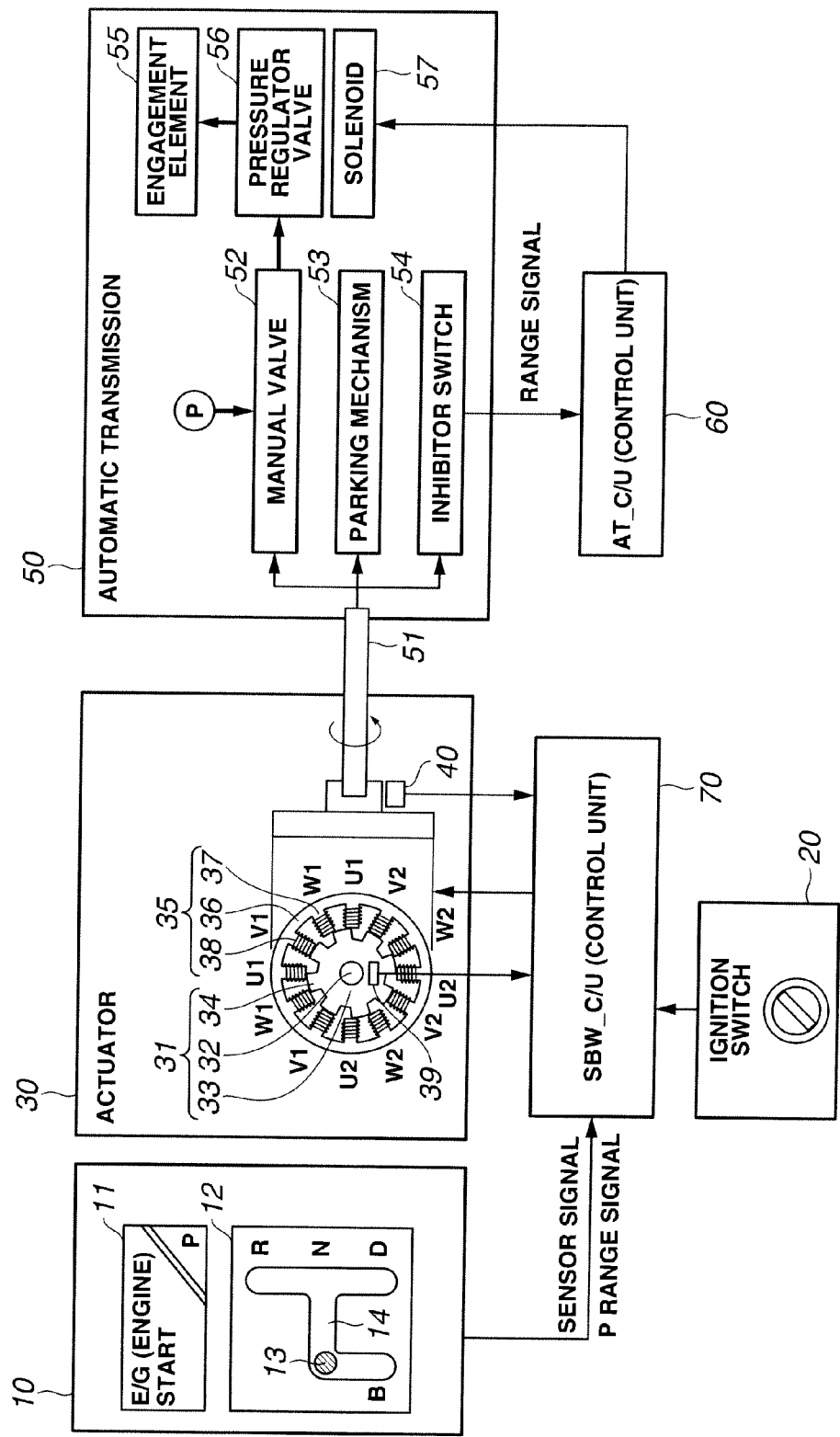
FIG. 1 is a system configuration view of a vehicular control apparatus for a shift-by-wire device in a preferred embodiment according to the present invention.

With reference to FIG. 1, a preferred embodiment of a vehicular control apparatus for a shift-by-wire device will be described hereinbelow.

An operation input section 10 for a shift-by-wire device includes a button switch 11 to operatively input an activation command of an engine (not shown but also referred to as a drive source); and a range selector 12 to operatively input a shift position of the automatic transmission. Operation input section 10 is installed at a position at which a manipulation through a vehicle driver is possible within a vehicular passenger compartment.

A button switch 11 (including a P button) which is an operation button of a push type is an interface to operatively command an activation of the engine. When ignition switch 20 is in an ON position (a power supply position), the engine is stopped, and, in response to a long-time push (for example, two seconds), the engine is activated.

Furthermore, button switch 11 has a function as an interface to command and input a parking range (P range) as a shift range of an automatic transmission. When ignition switch (power switch) 20 is at an ON position (a power supply position), a vehicle speed is zeroed (=0), and button switch 11 is depressed, a signal requesting that the shift range of automatic transmission (AT, 50) should be placed at the P range is outputted to a shift-by-wire control unit (SBW_C/U) (SBW CONTROL UNIT) 70. It should be noted that button switch 11 is used when the cancellation of an auto-parking control as will be described later is commanded and inputted other than the command input of the activation of the engine and the command input of the"P" range.

A range selector 12 is an interface to command and input a desired shift position when the vehicle driver operates a shift lever 13.

A shift pattern 14 loosely inserted into range selector 12 is formed in a shape in leftward-rightward reversals of an alphabetic letter of "h". Within shift pattern 14, a reverse range position (R range position), a forward range position (D range position), a neutral range position (N range position), and a regenerative brake position (B range position) are set and abbreviation letters of R, D, N, and B are inscribed on a surface of range selector 12 to identify the set shift position.

Shift lever 13 is guided along shift pattern 14 and movable in the respective selection ranges of "R range position", "N range position", and "B range position". Range selector 12 is returned to a predetermined home position (in a case of FIG. 1, a corner of an upward home position of "B range position" within shift pattern 14) when the vehicle driver's finger is separated from shift lever 13 since range selector 12 has a function of a self-return mechanism (not shown).

Range selector 12 includes a touch sensor (not shown) to detect which position of shift lever 13 is placed at the "R" range position, at the "N" range position, the "D" range position, or the home position. Range selector 12 outputs a signal (sensor signal) indicating the detected selection range to SBW_C/U (control unit) 70.

An ignition switch 20 is a switch switched between the ON position (the power supply position) and the OFF position (a power supply interruption position) according to an operation of the ignition key inserted into the key cylinder and installed at a position operable through the vehicle driver within the passenger compartment.

An actuator 30 is a brushless SR motor (a switched reluctance motor or a variable reluctance motor) without use of permanent magnets and includes a rotatably supported rotor 31 and a stator 35 arranged coaxially with a rotation center of rotor 31.

Rotor 31 includes: an output shaft 32 linked with a manual shaft 51 of automatic transmission 50; and a rotor core 33 press fitted into output shaft 32. Rotor teeth 34 (outwardly directed salient poles) projected at every 45 degrees toward outer peripheral stator core 36.

Stator 35 includes: a fixed stator core 36; and a plurality of excitation coils 38 having a plurality of phases generating a magnetic force in response to the power supply. Stator core 36 is provided with stator teeth 37 (inwardly oriented salient poles) projected at every 30 degrees toward inner rotor core 33. Excitation coils 38 are wound around excitation teeth 37 (first system coils U1, V1, and W1 in a primary system and coils U2, V2, and W2 in a secondary system) and generate a magnetic force for each of stator teeth 37. It should be noted that the magnetic force is generated for each of stator teeth 37 and coils U1, U2 are U phase and coils V1, V2 are V phase and coils W1, W2 are W phase.

In actuator 30, a power supply position and a power supply direction for each excitation coil 38 of U phase, V phase, and W phase are alternately switched in a predetermined sequence so that stator teeth 37 which magnetically absorb rotor teeth 34 are alternately switched so that rotor 31 (output shaft 32) is revolved in one or another direction. It should be noted that the detailed structure of actuator 30 is disclosed in a United States Patent Application Publication No. 2009/0000411 published on Jan. 1, 2009(, the disclosure of which is herein incorporated by reference in its entirety).

An encoder 39 detects a rotational angle of rotor 31 of actuator 30 and outputs a detected signal indicating the rotational angle to an SBW_control unit 70. SBW_control unit 70 performs a feedback control for actuator 30 on a basis of the signal inputted from encoder 39.

A rotary position sensor 40 detects a pivotal position for actuator 30 on a basis of the signal inputted from actuator 30 and outputs the signal indicating the detected pivotal position of manual shaft 51 to SBW_control unit 70. SBW_control unit 70 identifies the actual selection range of automatic transmission 50.

Manual valve 52 of automatic transmission 50 includes a spool (not shown) which forwards or retreats together with a pivotal movement of manual shaft 51. In accordance with the position of the spool (not shown) interlocked with the pivotal movement of manual shaft 51 and a destination of supply of a working oil under pressure (a working hydraulic pressure) from an oil pump P in accordance with a position of the spool.

It should be noted that, in automatic transmission 50, a forward range (D range), a reverse range (R range), a parking range (P range), and a neutral range (N range) are set as shift position s and the spool position is determined for each of the shift position s. Therefore, when the spool is moved to the D range position, manual valve 52 supplies the working hydraulic pressure to a D range oil passage and when the spool is moved to the R range position, manual valve 52 supplies the working oil pressure (the working hydraulic pressure) to an R range oil passage so that the working oil pressure (the working hydraulic pressure) is supplied to the R range oil position. Furthermore, when the spool is moved to the P range position or the N range position, the working oil pressure is not supplied to a related engagement element and is drained.

Parking mechanism 53 blocks the rotation of an output shaft (not shown) for automatic transmission 50 to block a movement of the vehicle in which automatic transmission 50 is mounted.

Parking mechanism 53 includes a parking rod which forwards and retreats together with the pivotal movement of manual shaft 51. When the parking rod is moved to the P range position, a parking pole is moved to a position other than the P range position (the R range position, the N range position, and the D range position) to allow the revolution of the output shaft with the parking pole separated from a parking gear. It should be noted that the detailed structure of parking mechanism 53 is disclosed in a Japanese Patent Application First Publication No. 2008-051174 published on Mar. 6, 2008.

An inhibitor switch 54 is mounted on a manual shaft 51 rotationally driven with actuator 30. The pivotal position of manual shaft 51 is determined for each of a shift position of automatic transmission 50 and inhibitor switch 54 serves to detect which position of the P range, the R range, N range position, and the D range position manual shaft 51 is placed at and outputs a signal indicating the detected position (a so-called a range signal) to automatic transmission control unit (AT_control unit) 60.

A shift ratio of automatic transmission 50 is determined on a basis of an accelerator opening angle signal inputted from the accelerator opening angle sensor and the range signal inputted from inhibitor switch 54. Then, an A/T control unit 60 controls a hydraulic pressure of pressure regulator valve 56 through solenoid 57 acted upon engagement for element 55 to achieve a combination of the engagement and release of the engagement element providing the determined shift ratio. It should be noted that automatic transmission includes a plurality of engagement elements and pressure regulator valve and solenoid are installed for each of engagement elements. Thus, FIG. 1 shows only one part thereof.

Shift-by-wire control unit (SBW_control unit) 70 performs the control of a drive of actuator 30 on a basis of signals inputted from an accelerator opening angle sensor and a vehicle speed sensor and the signal inputted from encoder 39 so that the shift position of automatic transmission 50 is modified.

SBW_control unit 70 identifies the selected shift position (the selection range) operated and selected through an operation input section 10 (shift lever 13 and button switch 11) on a basis of the signal inputted through operation input section 10 (the sensor signal and the P range signal) during an activation of the engine. Then, SBW_control unit C/U 70 drives actuator 30 so that the shift range of automatic transmission 50 is modified to the selection range.

For example, in a case where the selection range is in the "D range", SBW_C/U 70 pivots manual shaft 51 to the D range position. Thus, the spool of manual valve 52 and the parking rod of parking mechanism 53 are moved to the D range position together with the pivotal movement of manual shaft 51 so that the shift position of automatic transmission 50 is modified to "D range" position together with the pivotal movement of manual shaft 52. Furthermore, inhibitor switch 54 outputs the range signal indicating the D range of the selection range of automatic transmission to AT_control unit (AT_C/U) 60.

In addition, in a case where the selection shift range is "P" range, SBW_C/U (SBW CONTROL UNIT) 70 pivots manual shaft 51 to the "P" range position. Thus, the spool of manual valve 52 and the parking rod in parking mechanism 53 are moved to the "P" range position of automatic transmission 50 for the selection range to be modified to the "P" range, the output shaft of automatic transmission 50 is blocked, and the operation mode is in the parking state. In this case, inhibitor switch 54 outputs the range signal indicating that the selection range of automatic transmission 50 is in the "P" range to AT_C/U (AT CONTROL UNIT) 60.

SBW_C/U (SBW CONTROL UNIT) 70 executes the auto-parking control in which actuator 30 is driven to pivot manual shaft 51 to the P range position in a case where ignition switch 20 is switched to the OFF position even though the position of the shift range of automatic transmission 50, namely, even if the shift range is not the "P" range. This auto-parking control blocks the revolution of the output shaft of automatic transmission 50 through parking mechanism 53 so that the vehicle in which automatic transmission 50 is mounted and the state of automatic transmission 50 is in the parking state in which the revolutions of tire wheels are mechanically blocked and do not move mechanically.

Furthermore, when ignition switch 20 is placed on the ON position, SBW_C/U (SBW CONTROL UNIT) 70 executes the determination processing (auto-parking cancel determination processing) of whether the auto-parking control is cancelled or not when ignition switch 20 is in the ON position.

Furthermore, SBW_C/U 70 executes a determination processing of whether ignition switch 20 is in the ON position (an auto-parking cancellation determination processing) in a background procedure.

Figure 2:
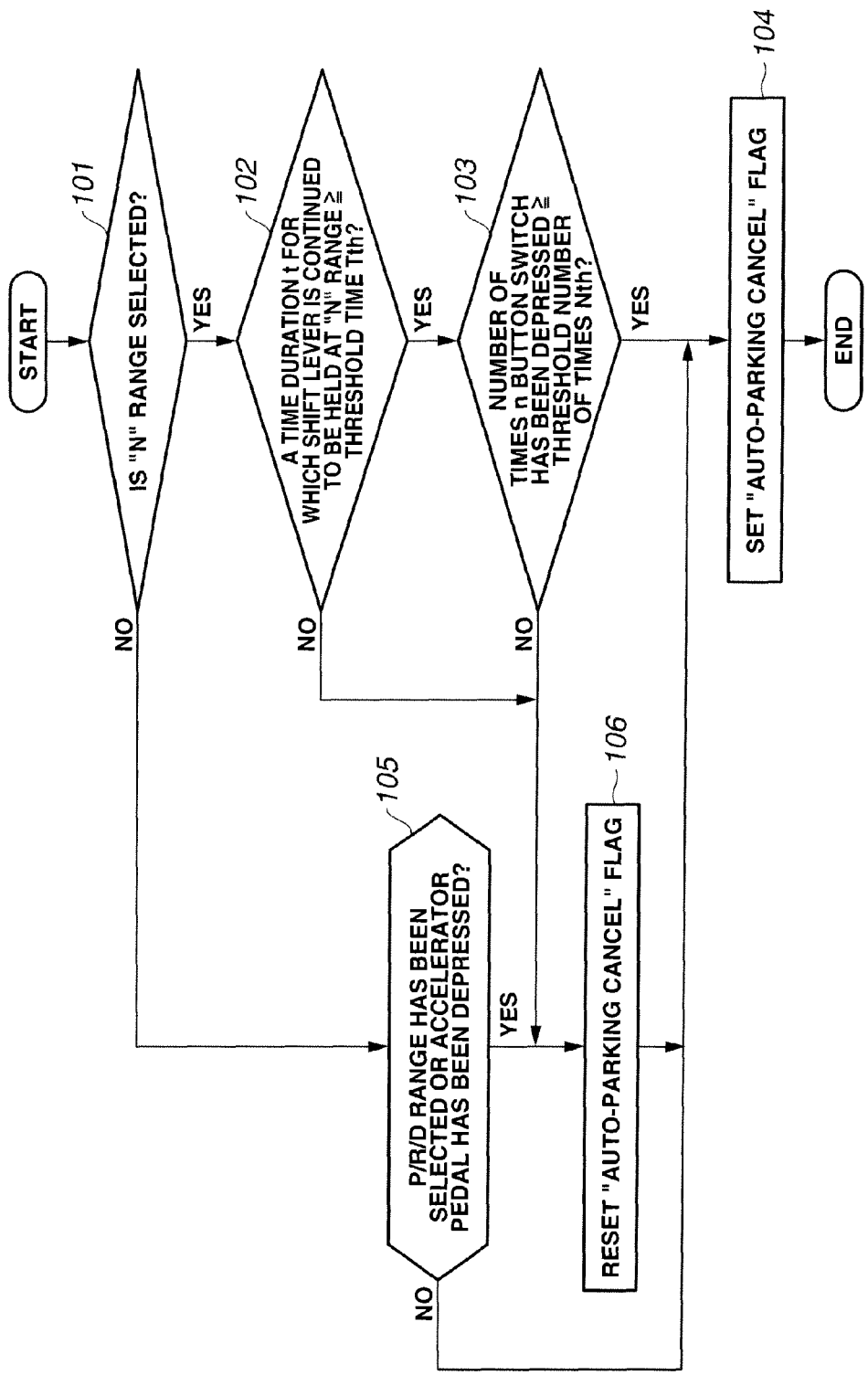
FIG. 2 is a flowchart representing an auto-parking control cancellation determination processing.

The auto-parking cancellation determination processing will be described hereinbelow that BSW_C/U 70 performs. FIG. 2 is a flowchart for explaining the auto-parking cancellation determination processing that BSW_C/U 70 performs.

At a step 101, SBW_C/U 70 determines whether shift lever 13 has been operated to select the "N" range.

If the "N" range position is selected (Yes) at step S101, at a step 102, SBW_C/U 70 determines whether shift lever 13 has been operated to maintain the shift position at the "N" range position continuously. Specifically, SBW C/U 70 maintains to be continued on the "N" range position for a time duration without return to the home position within a predetermined threshold value Tth (for example, 15 seconds). In other words, SBW C/U 70 determines whether the touch sensor installed at the "N" range position determines whether the time duration for which the contact of shift lever 13 is continued thereon (a continuation contact time t) is in excess of threshold value Tth (t≧Tth).

At a step 103, SBW_C/U 70 counts the number of times n by which button switch 11 has been depressed for the time duration until threshold time Tth during which shift lever 13 is held at the "N" range position to determine whether the number of times n which is equal to or greater than a threshold number of times Nth (for example, three times or more) has been depressed. It should, herein, be noted that a determination of whether button switch 11 has been depressed and a determination of the number of times n button switch 11 has been depressed are made on a basis of the P range signal inputted from input operation section 10.

In a case where the number of times n by which button switch 11 has been depressed is equal to or greater than the threshold number of times Nth (Yes at step 103) (n≧Nth), the routine goes to a step S104 in which the operation to command and input the auto-parking control cancellation (a cancellation operation for the auto-parking) is commanded and inputted to SBW_C/U 70 (an auto-parking cancellation operation has been carried out). When ignition switch 20 is, thereafter, switched into the OFF position, in order to request the cancellation inhibit for the operation of parking mechanism 53 with the shift range placed at the "P" range and to inhibit the operation of parking mechanism 53. Then, in order to inhibit operation of parking mechanism 53 with the shift range of automatic transmission 50 into the "P" range, an auto-parking control cancel flag is set. It should be noted that the auto-parking control cancel flag is a flag requesting the cancellation of the auto-parking control. It should be noted that the auto-parking control cancel flag is a flag requesting the cancellation of the auto-parking control.

Thus, when the auto-parking control cancel flag has been set and ignition switch 20 is switched to the OFF position to stop the engine, manual shaft 51 is pivoted to the "N" range position by driving actuator 30 without execution of auto-parking control except a case where button switch 11 has been depressed immediately before ignition switch 20 is switched to the OFF position. Thus, the spool of manual valve 52 and the parking rod of parking mechanism 53 are moved to the N range positions, respectively, so that the shift range of automatic transmission 50 is modified to the "N range". At this time, since the revolution of the output shaft of automatic transmission 50 is not blocked by parking mechanism 53, the vehicle is in the neutral position to enable the movement of the vehicle through the revolutions of road wheels.

It should be noted that if, at step 102, time duration t for which the shift position is held at threshold number of times Tth (t<Tth) or at step 103, the number of times n button switch 11 has been depressed is smaller than threshold number of times Tth (t<Tth), the routine goes to a step 106.

This is because it can be deemed that the selection of the "N" range by the vehicle driver at step 101 is not intended to cancel the auto-parking control.

Then, in the preferred embodiment, the determination processing of the auto-parking cancellation is repeatedly carried out while ignition switch 20 is placed at the ON position. Therefore, if, until ignition switch 20 is placed at the OFF position after the auto-parking cancel flag is switched to be set, such an operation input occurs that a determination is made that it is not necessary to change the shift position of automatic transmission 50 to the N range, the release of the auto-parking control cancellation is carried out.

For example, in a case where, while ignition position 20 is switched to the OFF position after the auto-parking cancel flag is set, shift lever 13 is operated except the operation pattern prescribed as a cipher code (steps 101, 102, 103, and 105) or in a case where the operation to start the vehicle has been carried out (step 105), the cancellation of the auto-parking control is released.

Specifically, after the auto-parking cancel flag is once set, (1) shift lever 13 is operated and the "P" range is selected (steps 101, 105) (2), in a case where time duration t to hold the "N" range position is shorter than threshold time Tth (steps 101, 102, and 103) in a case where button switch 11 is not depressed by the number of times equal to or greater than threshold number of times time Tth, the determination is made that (5) the operation other than button switch 11 has not been depressed by the threshold number of times Nth. After the auto-parking cancel flag is set (steps 101, 102, and 103), the determination is made that an operation other than the operation pattern prescribed as the cipher code has been carried out. In addition, after the auto-parking control cancel flag is once set, (4) (steps 101, 105) D range or R range is selected, in a case where it is confirmed that the accelerator pedal has been depressed on a basis of the accelerator opening angle signal inputted from accelerator opening angle sensor (not shown), the determination is made that the operation to start the vehicle has been carried out. It should be noted that the operation which is ordinarily carried out includes the operation in which shift lever (13) is placed at a prescribed position and the operation in which P button (11) is solely depressed and the operation in which these two lever and button switch are simultaneously operated is not the operation ordinarily carried out.

Then, in such a case as described above, SBW_C/U 70 resets the auto-parking control cancel flag (step 106) and the release of the cancellation of the auto-parking control is carried out. Thus, while ignition switch 20 is switched into the OFF position, the shift range of automatic transmission 50 is automatically modified to the "P range" when ignition switch 20 is switched into the OFF position unless the auto-parking cancel operation is again carried out until ignition switch 20 is switched into the OFF position.

In this way, under the constant condition, the cancellation of the auto-parking control is released. Thus, in a case where ignition switch 20 is switched to the OFF position forgetting that the vehicle driver cancels the auto-parking control, it can suitably be prevented that the vehicle is spontaneously moved.

Next, a relationship between a processing in which ignition switch 20 is switched between the ON position and OFF position and a processing in which an auto-parking process determination processing when ignition switch 20 is turned to the ON position will be described hereinbelow.

Figure 3:
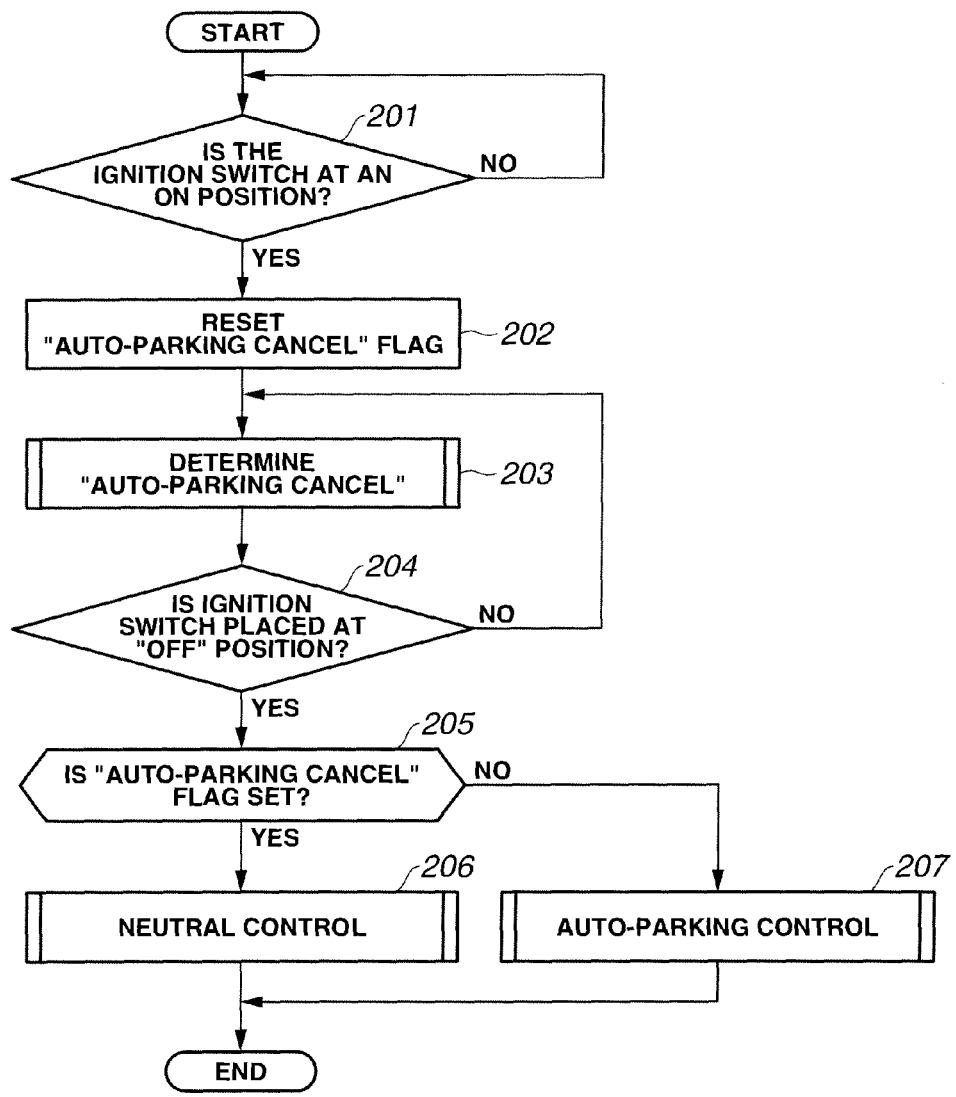
FIG. 3 is another flowchart representing a processing carried out when an ignition switch is switched to an ON position or an OFF position.

FIG. 3 shows a flowchart for explaining the relationship between a processing in which ignition switch 20 is switched between the ON and the OFF positions and a background processing when ignition switch 20 is in the ON position.

At a step 201, when ignition switch 20 is switched from the OFF position to the ON position (Yes), the routine goes to a step 202. At step 202, SBW_C/U 70 resets the auto-parking cancel flag. This is because, in order to prepare a case where the vehicle driver forgets the cancellation of the auto-parking control, the auto-parking control is automatically executed at a time at which the switching of the subsequent ignition switch 20 into the OFF position is carried out unless the auto-parking cancellation operation is carried out. In addition, this is because the switching to the auto-parking control is automatically executed when the subsequent switching of ignition switch 20 to the OFF position is carried out without carrying out of an additional operation for the release of the auto-parking control cancellation.

At a step 203, SWB_C/U 70 executes the auto-parking control cancel determination process described above.

At a step 204, SWB_C/U 70 confirms whether ignition switch 20 has been changed to the OFF position. If No (ignition switch 20 is not changed to the OFF position), the routine returns to step 203. During ignition switch 29 in the ON position, the auto-parking cancel determination processing is repeatedly executed and the set and reset of the auto-parking cancel flag is executed according to its necessity.

At step 204, in a case where ignition switch 20 has been changed to the OFF position, the routine goes to a step 205 in which SBW_C/U 70 confirms whether the auto-parking cancel flag has been set.

If the auto-parking control cancellation (cancel) flag is set (Yes at step 205), SBW_C/U 70 executes the neutral control at a step 206. Specifically, SBW_C/U 70 drives actuator 30 for manual shaft 51 to be pivoted to the "N" rage position. Thus, the spool of manual valve 52 and the parking rod of parking mechanism 53 are respectively moved to the N range position so that the shift range of automatic transmission 50 is changed to the "N" range position. At this time, the revolution of the output shaft of automatic transmission 50 is not blocked by means of parking mechanism 53 so that the vehicle is in the neutral state in which the road wheels are enabled to be revolved.

On the other hand, in a case where the auto-parking control cancel flag is not set, SBW_C/U 70 carries out the auto-parking control at a step 207. Specifically, irrespective of the selection shift range when ignition switch 20 is switched to the OFF position, namely, in a case where the shift range is in "R" range, "N" range, or "D" range, actuator 30 is driven so that manual shaft 51 is pivoted to the "P" range position. Thus, the spool of manual valve 30 and the parking rod of parking mechanism 53 are respectively moved to the "P" range positions. The shift range of automatic transmission 50 is modified to the P range position and the revolution of the output shaft of automatic transmission 50 is blocked by parking mechanism 53. Thus, the vehicle is in the parking state in which the revolutions of the road wheels cannot be moved.

It should, herein, be noted that operation input section 10 corresponds to an operation section (means) according to the present invention, SBW_C/U 70 corresponds to control means (a control section) according to the present invention, ignition switch 20 corresponds to a power switch according to the present invention, the P range of the shift range of automatic transmission 50 corresponds to a parking position according to the present invention, and the N range of automatic transmission 50 corresponds to the neutral range of automatic transmission. The D range, R range, and B range correspond to a traveling position according to the present invention.

As described hereinabove, in the preferred embodiment according to the present invention, the vehicular control apparatus for the shift-by-wire device to includes: operation input section 10 operated when the shift position of the vehicle is selected; and SBW_C/U 70 controlling actuator 30 to modify the vehicular shift range which corresponds to the operation input section 10, wherein, when ignition switch 20 is changed to the OFF position, actuator 30 is controlled to modify the shift range of automatic transmission 50 to the parking range to block the movement of the vehicle. The shift-by-wire device according to the present invention inhibits the modification of the parking range of automatic transmission 50 when the operation pattern of operation input section 10 during the time duration for which the ignition switch is in the ON position is made coincident with the operation pattern prescribed as the cipher code which inhibits the modification of the shift position to the parking position. At this time, when ignition switch 20 is changed to the OFF position SBW_C/U 70 inhibits the modification to the parking range of automatic transmission 50 and changes the shift range to the neutral range at which the vehicular movement is enabled. In addition, the operation pattern prescribed as the cipher code is constituted by a combination of the operations in the operation input section 10 which would not be carried out in the ordinary traveling.

Thus, since the modification to the parking range when ignition switch 20 is changed to the OFF position is inhibited using the operation section operated when the shift position is selected for the operation when the shift position is selected, it is not necessary to additionally install the button switch or so forth. Thus, the number of parts are not needed to be increased. Hence, it is not necessary to secure a large space to install operation input section 10. In addition, it is not necessary to secure the large space to install operation input section 10 within the vehicular passenger compartment. Furthermore, the operation pattern prescribed as the cipher code which inhibits the modification of the shift range to the parking range is constituted by the combination of the operations which would not be carried out in the ordinary traveling for operation input section 10 when the activation of the engine and the selection of the shift range are carried out. These operation patterns cannot be achieved by the operations during the ordinary driving and by accidental operations. Thus, if the driver inputs the cipher code which inhibits the shift range modification to the parking range unintentionally and irrespective of no intention by the vehicle driver of the shift range to be in the neutral range by releasing the parking range, it can be prevented from being in the neutral state with the vehicular parking state released. In addition, in a case where, in the assembly line on which the one-side conveyer has been adopted, the shift-by-wire vehicles having the auto-parking functions are caused to flow, it is not necessary to continuously turn the ignition switches in the ON states. Hence, a degradation (or a wasteful consumption) of the battery power can be prevented. In addition, after or before a stop date on which a production line does not work and during a replacement of a working operator, it is not necessary to carry out the ON or OFF position change for all of the ignition switches of all of the vehicles on line with the engine activated (driven). Hence, a worsening of an working environment due to a cause of exhaust gas can be prevented.

The operation pattern prescribed as the cipher code takes a condition such that, in a state where shift lever 13 is continued to be maintained at the "N" range position, button switch 11 to be switched to the "P" range is depressed by the threshold number of times (Nth). This is the operation pattern constituted by the combination of operations not related to the activation of the drive source such as the engine, the motor, or so forth and is constituted by the depression operations of shift lever 13 and is constituted by operation of shift lever 13 and depression operation of button switch 11. Thus, since the operation to cancel the auto-parking control becomes more complex, it can further accurately be prevented that the auto-parking control is cancelled without the intention by the vehicle driver so that, irrespective of no intention by the vehicle driver of releasing the parking range, the vehicular parking state is released and the vehicle is in the neutral state.

The inhibit of the shift range modification to the parking range due to the cancellation of the auto-parking control is valid until ignition switch 20 is switched to the OFF position and is released when ignition switch 20 is switched to the ON position at the next time. Even if ignition switch 20 is switched to the OFF position after the cancellation operation of the auto-parking control and the auto-parking control is forgotten to be cancelled during the OFF position of ignition switch 20, the cancellation of the auto-parking control is released when ignition switch 20 is switched to the ON position again (at the next driving cycle). When ignition switch 20 is changed to the OFF position, the shift range is automatically modified to the parking range unless the cancellation operation of the vehicle is again carried out. Hence, since the shift range is automatically modified to the parking range when ignition switch 20 is switched to the OFF position unless the auto-parking cancel operation is again carried out, it can be prevented that the vehicle is moved unintentionally after ignition switch 20 is in the OFF position at the next driving cycle.

It is not necessary to carry out additionally the operation (the auto-parking) to release the cancellation of the auto-parking control. The auto-parking control is executed when the ignition switch which has been again changed to the ON position after the ignition switch has been changed to the OFF position.

Thus, it is not necessary to carry out the operation to release the cancellation of the auto-parking control for each vehicle outputted from the production line. Consequently, a workability can be improved and the working cost can be reduced.

Until, after SBW_C/U 70 inhibits the shift position modification to the parking range position with the auto-parking control cancelled, ignition switch 20 is again switched to the OFF position and while ignition switch 20 is switched to the OFF position, the input to start the vehicle (manipulations of shift lever 13 or the accelerator manipulation) or the selection of parking range due to the operation of operation input section 10 to the parking range is made. At this time, the release of the cancellation of the auto-parking control is carried out to release the inhibit of the modification to the parking range is made. In a case where the input to start the vehicle or the selection to the parking range is present, an erroneous auto-parking cancel operation or the vehicle driver's intention to release the cancellation of the auto-parking control is carried out in this case. Thus, in a case where the auto-parking cancel operation is caused by a mistaken operation, is can furthermore be prevented that the parking state of the vehicle is released and the neutral state is present. In addition, even if the erroneous (mistaken) operation is made and, thereafter, the vehicle is started to run, there is a possibility of the vehicle driver's forgetting that the auto-parking control has been cancelled. In this case, there is a possibility that the vehicle is moved after ignition switch 20 is changed to the OFF position. In a case where the input to start the vehicle is present, the cancellation of the auto-parking control is released. Consequently, the occurrence of the above-described matter can suitably be prevented.

It should, herein, be noted that, in this embodiment, a case where button switch 11 has been operated three times or more within 15 seconds for which shift lever 13 is continued to be held at the "N" range position as the operation pattern prescribed as the cipher code is exemplified, as the operation pattern prescribed as the cipher code. However, this can appropriately be modified in a case of a combination of the operations which would not ordinarily be carried out in the operation input section 10 within a predetermined time, particularly, in a case of the combination of continuously carried out operations.

Thus, in a case where the "N" range is selected a predetermined number of times (for example, three times) within the predetermined time (for example, ten seconds) (a predetermined number of times button switch 11 has been contacted on the touch sensor installed at the "N" range position), a determination may be made that the operation (auto-parking cancel operation) which is made coincident with the operation pattern prescribed as the cipher code has been carried out and the auto-parking control may be cancelled.

In the preferred embodiment, by the combination between the operation of the "N" range position of shift lever 13 and the depression operation of button switch 11, the auto-parking control can be cancelled. However, the present invention is applicable to a case of a vehicle in which the selection of the shift range is carried out through the depression of button switch 11. In this case, in the operation input section operated when the shift position is selected, an exclusively used (self-contained) button switch is prepared for each of the shift ranges. For example, the auto-parking control may be cancelled in a case where, while the "D" range selection button and the "R" range selection button are depressed simultaneously, the operation for ignition switch 20 to be changed to the OFF position is carried out. In this case, since the simultaneous depresses on the "D" range selection button and the "R" range selection button are a combination of operation that would not be carried out in the ordinary operation, such an operation as described above is prescribed as the cipher code which inhibits the shift range modification to the parking range. Thus, it can be prevented that the parking state of the vehicle is released and is in the neutral state in spite of the fact that the vehicle driver has no intention to release the parking range. It should be noted that a case where, while depressing the N range selection button and the P range selection button simultaneously, the D range selection button is depressed and a case where D range selection button is depressed three times may be prescribed as the cipher code which inhibits the shift range modification to the parking range. It should be noted that the operation which is ordinarily carried out includes the operation in which shift lever (13) is placed at a prescribed position and the operation in which P button (11) is solely depressed and the operation in which these two lever and button switch are simultaneously operated is not the operation ordinarily carried out.

In the above-described embodiment, the present invention is applicable to a vehicle in which the automatic transmission in which the combination between the engagements and releases of the plurality of engagement elements achieve the desired shift range. The present invention is also applicable to a continuously variable transmission of a belt type. Furthermore, in this embodiment, the case of the automatic transmission having the manual valve is exemplified. However, the present invention is applicable to the automatic transmission in which the manual valve is omitted.

In addition, the present invention is applicable to a vehicle in which the ignition switch has been adopted. However, the present invention is also applicable to a vehicle (so called, a vehicle in which a keyless entry system is adopted in which a certification through a wireless communication is carried out between an on-vehicle phone and an handy phone that the vehicle driver has and the activation and stop of the engine are carried out only through, for example, a button operation. In this case, the button through which the activation and stop of the engine are carried out corresponds to the power switch according to the present invention.

In addition, the present invention is applicable to a vehicle operated by a revolution driving force inputted from the engine but also applicable to a vehicle operated with the revolution driving force inputted from at least one of the engine and the motor or the present invention is applicable to the revolution driving force inputted from the motor. The present invention is suitably applicable to the engine driven vehicle, a so-called hybrid vehicle, and an electric vehicle. In the case of the hybrid vehicle, the engine and the motor correspond to the drive source according to the present invention.

Furthermore, as the mechanism to block the movement of the vehicle in the parking range, parking mechanism 53 to block the revolution of the output shaft of automatic transmission 50 is exemplified. However, the present invention is applicable to a vehicle in which the actuator is controlled to move the road wheels of the vehicle.

In this case, when the operation pattern prescribed as the cipher code is performed, the operation of a road wheel brake system is made inoperable when the power switch is turned to OFF.

This application is based on a prior Japanese Patent Application No. 2009-034658 filed in Japan on Feb. 17, 2009. The entire contents of this Japanese Patent Application No. 2009-034658 are herein incorporated by reference in its entirety. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A vehicular control apparatus for a shift-by-wire device, comprising:
an operation section configured to be manually operable to select one of shift positions constituted by a vehicular parking position, a neutral position, and a traveling position; and
a control section configured to control an actuator to modify at least one of the parking position, the neutral position, and the traveling position, the control section modifying the shift position to the vehicular parking position at which a movement of the vehicle is blocked through the actuator when a power switch configured to switch a vehicular power supply to at least one of an ON position and an OFF position is changed to the OFF position, the control section inhibiting the modification of the shift position to the vehicular parking position and modifying the shift position to the neutral position at which the vehicle is enabled to move when an operation pattern of the operation section while the power switch is in the ON position is coincident with the operation pattern prescribed as a cipher code which inhibits the modification of the shift position to the vehicular parking position, and the operation pattern prescribed as the cipher code being constituted by a combination of the operation patterns which would not be carried out in the operations of the operation section during an ordinary traveling.

2. The vehicular control apparatus for the shift-by-wire device as claimed in claim 1, wherein the operation pattern prescribed as the cipher code is an operation pattern constituted by an operation un-related to the vehicular traveling and different from the operation which would ordinarily be carried out when at least one of the vehicular parking position, the neutral position, and the traveling position is selected.

3. The vehicular control apparatus for the shift-by-wire device as claimed in claim 1, wherein the operation pattern prescribed as the cipher code is constituted by a combination of the operations of a shift lever for selecting the shift position and a depression operation of the switch.

4. The vehicular control apparatus for the shift-by-wire device as claimed in claim 1, wherein the inhibit of the shift position modification to the vehicular parking position is valid until the power switch is changed to the OFF position and is released when the power switch is to be in the ON position at the next time.

5. The vehicular control apparatus for the shift-by-wire device as claimed in claim 1, wherein the inhibit of the shift position modification to the vehicular parking position is released in a case where at least one of the input to start the vehicle and an operation by the operation section other than the operation pattern prescribed as the cipher code is carried out until the power switch is changed to the OFF position after the operation of the operation pattern prescribed as the cipher code has been carried out.

6. The vehicular control apparatus for the shift-by-wire device as claimed in claim 1, wherein the control section comprises: a first determining section configured to determine whether a shift lever of an automatic transmission is operated to select the shift position to an "N" range: a second determining section configured to determine whether the shift lever is operated to be continued to be held at the "N" range when the first determining section determines that the shift lever is operated to select the shift position to the "N" range; a third determining section configured to determine whether a button switch to command an activation of an engine has been depressed by a predetermined number of times or more while a predetermined time has elapsed from a time at which the shift lever is in the "N" range when the second determining section determines that the shift lever is operated to be continued to be held at the "N" range; and a fourth determining section configured to determine that an operation to command a cancellation of an auto-parking control is carried out when the third determining section determines that the number of times the button switch has been depressed while the predetermined has elapsed from the time at which the shift lever is selected to the "N" range.

7. The vehicular control apparatus for the shift-by-wire device as claimed in claim 6, wherein the fourth determining section sets an auto-parking cancel flag when determining that the operation to command the cancellation of the auto-parking control is carried out.

8. The vehicular control apparatus for the shift-by-wire device as claimed in claim 7, wherein, when the power switch is switched to the OFF position to stop the engine while the auto-parking cancel flag is set and the control section inhibits an execution of the auto-parking control, the control section drives the actuator to pivot a manual shaft to an N range position.

9. The vehicular control apparatus for the shift-by-wire device as claimed in claim 7, wherein, when the second determining section determines that a time duration t for which the shift position is held at the N range position is shorter than the predetermined threshold time Tth or when the third determining section determines that the time duration Tth for which the button switch has been depressed is shorter than the predetermined threshold time Tth (t<Tth), the cancellation of the auto-parking control is executed.

10. The vehicular control apparatus for the shift-by-wire device as claimed in claim 7, wherein the cancellation of the auto-parking control is released when any operation other than the operation pattern prescribed as the cipher code is carried out through the shift lever or when the operation to start the vehicle is carried out, until the power switch is switched to the OFF position after the auto-parking cancellation flag is set.

11. A vehicular control method for a shift-by-wire device, comprising:
   providing an operation section configured to be manually operable to select one of shift positions constituted by a vehicular parking position, a neutral position, and a traveling position;
   controlling an actuator to modify at least one of the vehicular parking position, the neutral position, and the traveling position;
   modifying the shift position to the vehicular parking position at which a movement of the vehicle is blocked through the actuator when a power switch configured_to switch a vehicular power supply to at least one of an ON position and an OFF position is changed to the OFF position; and
   inhibiting the modification of the shift position to the vehicular parking position and modifying the shift position to the neutral position at which the vehicle is enabled to move when an operation pattern of the operation section while the power switch is in the ON position is coincident with the operation pattern prescribed as a cipher code which inhibits the modification of the shift position to the vehicular parking position, the operation pattern prescribed as the cipher code being constituted by a combination of the operation patterns which would not be carried out in the operations of the operation section during an ordinary traveling.

* * * * *